United States Patent [19]

Hatam-Tabrizi

[11] Patent Number: 5,321,568
[45] Date of Patent: Jun. 14, 1994

[54] HEAD SUSPENSION ASSEMBLY WITH IMPROVED PITCH AND ROLL CHARACTERISTICS

[75] Inventor: Shahab Hatam-Tabrizi, Los Altos, Calif.

[73] Assignee: Maxtor Corporation, San Jose, Calif.

[21] Appl. No.: 52,573

[22] Filed: Apr. 22, 1993

[51] Int. Cl.⁵ ............................................. G11B 5/48
[52] U.S. Cl. .................................................... 360/104
[58] Field of Search ................................ 360/103-105

[56] References Cited

U.S. PATENT DOCUMENTS 4,216,505 8/1980 Grant et al. ......................... 360/104
4,868,694 9/1989 Hagan ................................. 360/104
5,166,847 11/1992 Zak ..................................... 360/104

Primary Examiner—John H. Wolff
Attorney, Agent, or Firm—Blakely, Sokoloff, Taylor & Zafman

[57] ABSTRACT

A rotary actuated arm assembly for positioning a transducer over a data track of a rotating magnetic disk includes a flexure attached to a load beam at one end and to a slider at the other end. The flexure comprises a thin piece of metal having dimple which contacts the load beam at a point. The dimple allows the slider to pitch and roll about the point to accommodate height variations across the surface of the disk. An elastomeric material is bonded to both the flexure and the load beam at a location near or surrounding the dimple. The elastomeric material imparts radial stiffness to the assembly so that the load beam maintains contact with the dimple at the desired point, regardless of the radial movements of the assembly.

4 Claims, 2 Drawing Sheets

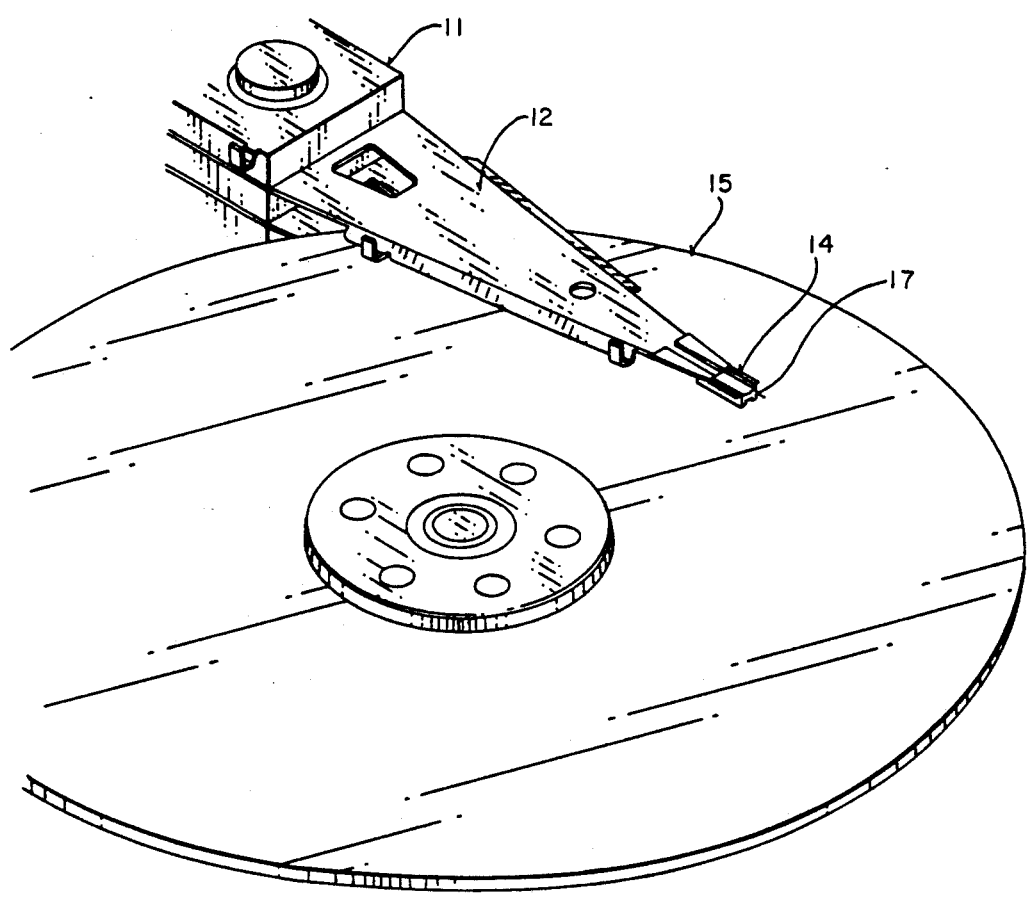
FIG _ 1

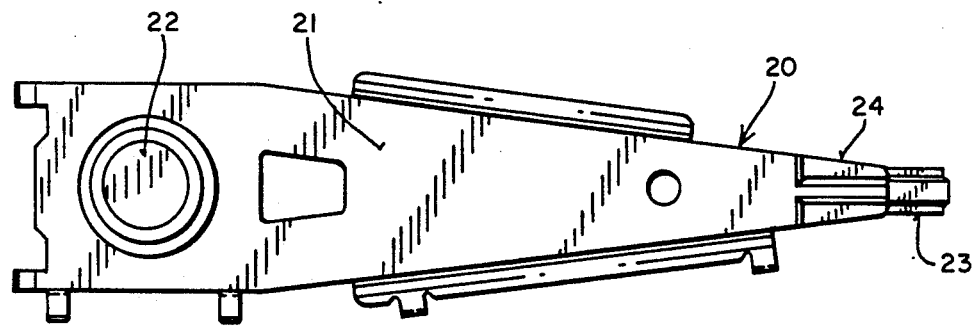
FIG_2A
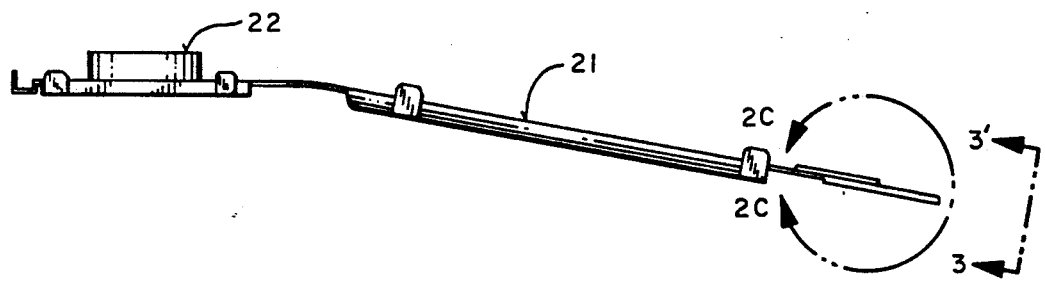
FIG_2B
FIG_2C
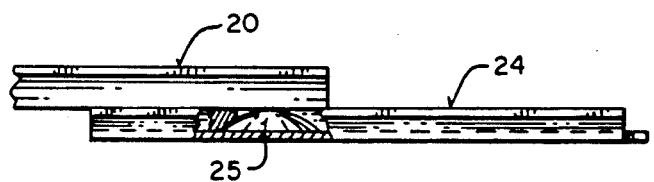
FIG_3
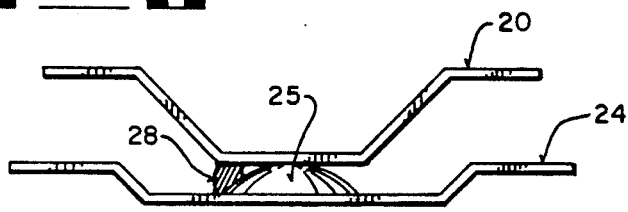
FIG_4
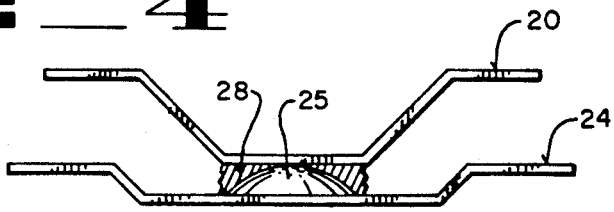

HEAD SUSPENSION ASSEMBLY WITH IMPROVED PITCH AND ROLL CHARACTERISTICS

FIELD OF THE INVENTION

The present invention relates to the field of magnetic recording; in particular, to structures for supporting and positioning a magnetic transducer over a recording disk medium.

BACKGROUND OF THE INVENTION

In a hard disk drive, normally a transducer is positioned by a suspension apparatus over a magnetic disk to facilitate reading and writing of information to the disk. The suspension apparatus is commonly coupled to a rotary actuator which can position the transducer in a radial direction across the magnetic disk. As is well known, the transducer itself is commonly attached to a slider which, in turn, is mounted to the head suspension assembly. During normal operation, the slider actually flies over the surface of the disk due to the hydrodynamic pressure generated by the rotation of the disk. For optimum performance, the flying height must be kept uniform to minimize errors in the reading and writing of data to the disk. Because the magnetic disks themselves are often flawed by imperfections, the slider must be able to pitch and roll over the surface of the disk in order to maintain a uniform flying height. If the slider were inhibited from pitching and rolling over the surface of the disk, then the slider would not be able to accommodate the height variations on the disk. If such were the case, errors in the read/write operations would result.

One of the ways that conventional suspension assemblies have achieved pitch and roll motion is by the incorporation of a dimple which contacts both the top surface of the slider and the load arm of the suspension apparatus. The dimple has a rounded contact point about which the slider can pivot in order to accommodate variations in the topography of the disk. The problem with these types of assemblies is that the radial stiffness of the suspension assembly is generally insufficient to resist rapid motions of the actuator. As is well known, the actuator includes an electromagnetic coil which, when energized, causes the head to be moved from one radial position to another (i.e., from one data track to another). What happens is that as the head is moved across the disk, the dimple slides in a lateral direction to a point on a load arm where the transducer is positioned off-track. Obviously, when this occurs, errors in the reading and writing of data often result. This problem of dimple movement resulting from rapid actuator motion is commonly referred to as the "stick-slip" problem.

One approach to the stick-slip problem has been to increase the stiffness of the load beam and flexure elements of the arm assembly. However, this adds considerable mass to the arm assembly resulting in significantly slower seek times.

Another approach described in U.S. Pat. No. 4,868,694 involves increasing the radial stiffness of the arm assembly by means of a completely redesigned flexure for the rotary actuated load arm. Basically, the flexure is designed to have a U-shaped slot which is perpendicular to the longitudinal axis of the load arm. The drawback of this approach, however, is that it requires a complete redesign of the head suspension apparatus. This means that existing disk drives cannot easily be retrofitted.

Thus, there is a need for a simple solution to the stick-slip problem which does not involve a substantial increase in the mass of the arm, or a major redesign of the head suspension assembly. As will be seen, the present invention provides a solution to the stick-slip problem which is easy to implement and can be incorporated into existing disk drive units.

SUMMARY OF THE INVENTION

A rotary actuated arm assembly is described for positioning a transducer over a data track of a rotating magnetic disk. The arm assembly includes a slider having a top surface with the transducer being affixed to a side surface of the slider. The slider flies above the surface of the disk due to the hydrodynamic pressure generated by the rotation of the magnetic disk. An elongated load beam is attached to a flexure at one end. The flexure comprises a thin piece of metal having a first end attached to the top surface of the slider and a second end attached to the end of the load beam. The load beam itself is connected to a rotary actuator which pivots about a point so as to position the slider radially across the surface of the disk.

The flexure includes a dimple for contacting the load beam at a point to allow the slider to pitch and roll as it flies over the surface of the disk. An elastomeric material is bonded to both the flexure and the load beam at a location near or surrounding the dimple. The elastomeric material imparts radial stiffness to the assembly so that the load beam maintains contact with the dimple at the desired point, despite sudden start/stop movements of the assembly.

BRIEF DESCRIPTION OF THE DRAWINGS

The present invention is illustrated by way of example and not limitation in the figures of the accompanying drawings, in which like references indicate similar elements, and in which:

FIG. 1 is a perspective view of a head suspension assembly for positioning a transducer above the surface of a rotating magnetic disk.

FIG. 2A is a top view of the head suspension assembly currently used in one embodiment of the present invention.

FIG. 2B is a side view of the head suspension assembly of FIG. 2A.

FIG. 2C is an enlarged side view of the flexure element of the assembly shown in FIG. 2B.

FIG. 3 is a front side view taken along cut lines 3-3' of the flexure element shown in FIG. 2C. The view of FIG. 3 shows one embodiment of the present invention.

FIG. 4 is a front side view taken along cut lines 3-3' of the flexure element shown in FIG. 2C. The view of FIG. 4 shows an alternative embodiment of the present invention.

DETAILED DESCRIPTION

A head suspension assembly with improved pitch and roll characteristics is described. In the following description numerous specific details are set forth such as material types, dimensions, processes, etc., in order to provide a thorough understanding of the present invention. It will be obvious, however, to one of ordinary skill in the art that the invention may be practiced without these specific details. In other instances, well known elements and processing techniques have not been shown in particular detail in order to avoid unnecessarily obscuring the present invention.

With reference to FIG. 1, there is shown a perspective view of a head suspension assembly comprising a slider 17 having top, bottom and side surfaces. Along the trailing side surface, a transducer is attached to the slider so that information can be written to and read from the rotating magnetic disk 15, over which the slider flies. Note that the top surface of the slider body is attached to a flexure element 14 which typically comprises a thin piece of metal. Most often, flexure 14 includes various shaped slots which increase its flexibility; this is one way that the slider is allowed to pitch and roll over height variations present on the surface of the disk. Flexure 14 is shown attached to load beam 12, which is mounted to the actuator arm via mounting block 11.

The basic requirement of flexure 14 is that it be mechanically strong enough to hold slider 17 rigidly in place as it is positioned over the magnetic disk, and at the same time provide enough flexibility so as to allow the slider to pitch and roll over topological variations present on the surface of the disk.

As explained above, one of the ways in which the pitch and roll characteristics of the slider has been improved is by the incorporation of a bump or dimple disposed on a central portion of flexure 14 (not visible in FIG. 1). The dimple contacts both the top surface of the slider and the load beam so that, in effect, the slider is continuously pressed against the contact point formed by the dimple. Because the dimple is formed to have a semi-spherical or rounded surface the slider can easily pivot about the contact point formed by the dimple. This, in turn, facilitates a pitching and rolling motion of the slider.

The problem with prior art designs is that as the actuator rotates to position the transducer over a desired track of disk 15, the start/stop force can cause the slider to slide and stick in a position where the transducer cannot read or write data on the desired track. The solution to this problem offered by the present invention is to apply an elastomeric material between the load beam and the flexure at a location near or surrounding the dimple. The elastomeric material adheres to both the load beam and the flexure to prevent any lateral or radial movement relative to the load beam as result of the acceleration of the actuator mechanism. Because of its adhesive properties, the elastomeric material causes the dimple to stay in place so that the slider cannot slide to an off-track position. It is appreciated by practitioners in the art that as little as 70 to 80 microinches of movement of the slider can cause track misalignment resulting from the radial acceleration of the actuator arm.

An additional benefit of the present invention is that the presence of the elastomeric material at or near the dimple contact point helps to dampen mechanical resonances. Obviously, mechanical resonances on the head suspension assembly can adversely affect the drive's servo system as well as impair the setting of the data heads.

It should be understood that the elastomeric material should have properties which allow it to adhere to the surfaces of the load beam and the flexure while maintaining a sufficient measure of flexibility so that the slider can still pitch and roll about the contact point where the load beam and dimple meet. This means that the elastomeric material must have both compressive and expansive properties in order to accommodate topographical variations in the surface of the disk. The elastomeric material must also have adequate adhesive properties in order to maintain the correct position of the dimple in relation to the load beam.

Referring now to FIGS. 2A-2C, one embodiment of the invented head suspension assembly is shown. FIG. 2A is a top view of the head suspension showing the load beam 21 having at one end an orifice 22 that is used during the mounting process for mounting the load beam to the actuator arm. The common procedure for mounting the load beam to the arm is a ball staking method wherein a hollow pin is inserted within orifice 22 and a ball is driven through the hollow pin to expand the pin laterally. This forces the flexure into firm contact with the mounting pad. Load beam 21 also includes a tapered end 20 which attaches to flexure 24. As discussed earlier, flexure 24 is attached between end 20 of load beam 21 and the top surface of slider 23.

The side view of the head suspension assembly shown in FIG. 2B illustrates how the load beam is pre-loaded so that a downward pressure is applied on the slider against the disk recording medium. The downward pressure also forces the dimple into contact with the load beam. This contact point is maintained at the same location relative to the load beam as the slider flies over the surface of the magnetic disk. (Note that in FIG. 2B, slider 23 is not shown to simplify the illustration.)

FIG. 2C is an expanded view of the flexure portion of the invented suspension. The view of FIG. 2C shows the location of dimple 25 as it contacts end 20 of load beam 21. The relation of dimple 25 to flexure 24 is also shown. It should be apparent that dimple 25 is actually a rounded protuberance or semi-spherical bump formed on one surface of flexure 24.

FIG. 3 is a side view of the flexure portion of the suspension illustrated in FIG. 2B, as taken along sectional cut lines 3-3'. The view of FIG. 3 illustrates the relationship between end 20 of load beam 21 and flexure 24. As shown, dimple 24 is centrally located between flexure 24 and end 20, and includes a deposit of elastomeric material 28 attached to both members 20 and 24 at a point near the side of dimple 25. Similarly, FIG. 4 illustrates another embodiment in which the elastomeric material 28 completely surrounds dimple 25; essentially forming a ring around dimple 25 so as to prevent any undesirable sliding motion of the dimple against the load beam during acceleration of the actuator.

In a preferred embodiment, a two-stage polyurethane is utilized as elastometric material 28. This material is applied at room temperature to the interface between flexure 24 and end 20 of load beam 21. The application of material 28 takes place at room temperature, followed by a curing process wherein the apparatus is heated to a temperature of approximately 70°-100° C. for about 4-6 hours. Practitioners in the art will appreciate that this curing temperature is sufficiently high enough above the drive's normal operating temperature so as to insure that material 28 will not melt or otherwise alter its characteristics when in use in the recording system. Preferably, the polyurethane material has durometer (i.e., measure of hardness) of about 50-60 A. This level of hardness permits the material to have sufficient flexibility while still constraining any lateral movement tendencies. It has been determined that the above-prescribed range of hardness is sufficient to overcome lateral load forces of approximately 1.5 grams, in addition to any acceleration and windage forces on the arm which may be on the order of 0.5 to 2.5 grams.

It should be understood that elastomer 28 could comprise a wide variety of materials, since numerous materials provide the properties described above. That is, there exist many commercially-available adhesives and other compounds which could be used to overcome the lateral forces typically generated during the drive's normal operation, while maintaining the requisite flexibility so as to allow the slider to pitch and roll over the surface of the disk.

It is also worth noting that the elastomeric material can be applied to the interface between the flexure and the load beam according to many different application methods. By way of example, one simple application method for delivering the elastomeric material to the dimple contact point is by means of a syringe. The end of the syringe is placed at or near the dimple and an adequate amount of the elastomeric material is then delivered to the interface. Once applied, the material can then be cured as described above. It is appreciated that the application of the elastometric can occur at just about any point of the disk drive manufacturing process. In this respect, for example, the elastomer could alternatively be applied either during the sub-assembly of the head stack, following attachment of the slider to the suspension, or even after the drive has been completely manufactured. It should be understood that this later application method would be the one employed in order to eliminate the stick-slip problem in existing disk drive systems.

Whereas many alternations and modifications to the invention will no doubt become apparent to the person of ordinary skill in the art after having read the forgoing disclosure, it should be understood that the particular embodiments shown and described by way of illustration are in no way intended to be limiting. Therefore, reference to the details of the illustrated diagrams is not intended to limit the scope of the claims which themselves recite only those features regarded as essential to the invention.

What is claimed is:

1. A rotary actuated arm assembly comprising:
   a slider having a top surface;
   an elongated load beam having an end;
   a flexure comprising a thin piece of metal having a first end attached to said top surface of said slider and a second end attached to said end of said load beam
   said flexure further comprising a rounded protuberance for contacting said load beam at a point allowing said slider to pitch and roll as it flies over the surface of said disk;
   an elastomeric material bonded to both said flexure and said load beam disposed near said rounded protuberance, said material imparting radial stiffness to said assembly so that said load beam maintains contact with said rounded protuberance at said point when said assembly is moved, said material having sufficient elastomeric properties so as to allow said slider to pivot about said point in response to variations of the topography of said disk.

2. The arm assembly of claim 1 wherein said material comprises a polyurethane.

3. The arm assembly of claim 2 wherein said polyurethane has a durometer of approximately 50 to 60 A.

4. The arm assembly of claim 3 wherein said elastomeric material surrounds said protuberance, forming a ring shape thereabout.

* * * * *